May 26, 1931.  D. E. SPEICHER  1,807,449
BAG
Filed Jan. 23, 1929
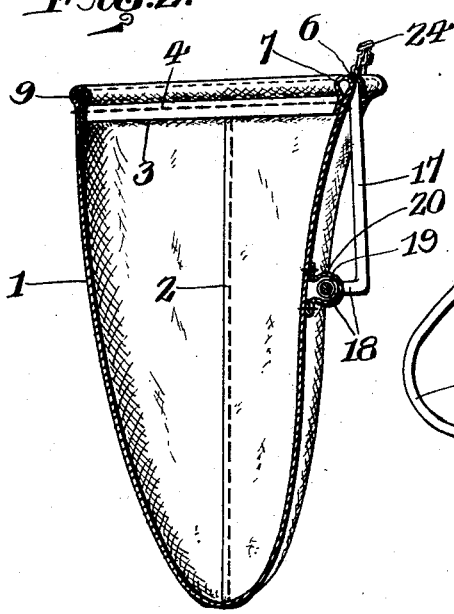
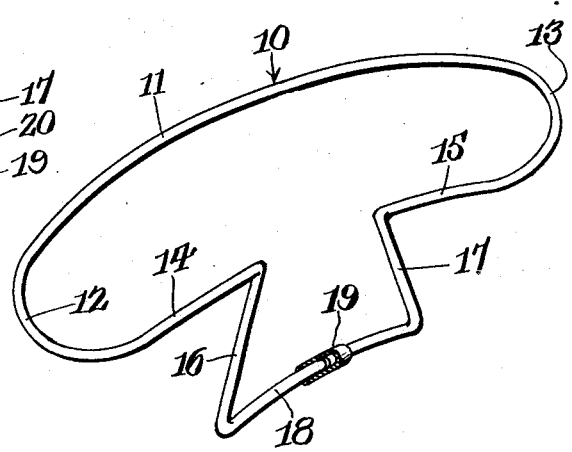
INVENTOR.
Daniel E. Speicher,
BY
Geo. P. Kimmel
ATTORNEY.

Patented May 26, 1931

1,807,449

UNITED STATES PATENT OFFICE

DANIEL E. SPEICHER, OF URBANA, INDIANA

BAG

Application filed January 23, 1929. Serial No. 334,483.

This invention relates to a bag of the harvester type designed for use when picking and planting, or for any other purposes for which it may be found applicable, and the invention has for its object to provide, in a manner as hereinafter set forth a bag of the class referred to for suspension from the shoulders of a person and having means for permanently maintaining the mouth of the bag open, and with such means extended to provide a brace abutting the person to prevent the bag tipping over forwardly when filling the latter, or when the bag is filled or when manually distributing seed therefrom.

A further object of the invention is to provide, in a manner as hereinafter set forth, a bag of the class referred to having means for permanently maintaining the mouth thereof open and with such means extended to provide a depending brace for abutting the person, the brace being positioned rearwardly of and connected to the bag body and acting to prevent the bag from tipping over forwardly when filling, when filled or when manually distributing seed therefrom.

Further objects of the invention are to provide, in a manner as hereinafter set forth, a bag of the class referred to which is simple in its construction and arrangement, strong, durable, compact, thoroughly efficient in its use, carried by a person without any discomfort, readily assembled and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a perspective view of a bag in accordance with this invention.

Figure 2 is a vertical sectional view thereof.

Figure 3 is a perspective view of a combined reinforcing frame and brace.

The bag body 1 can be of any desired dimensions, that is to say as to width, breadth and height, and is formed of any suitable flexible material, preferably canvas. The body 1 can have its mouth of any suitable contour, is illustrated as substantially oval and which is the preferred arrangement. The body 1 is so formed as to gradually decrease in width from its mouth to its bottom. The body 1 is set up from a length of canvas folded upon itself and stitched together at one end as at 2. The body 1 at its top is folded or overlapped inwardly, as at 3 and with the fold stitched, as at 4 to provide a hem extending entirely around the mouth edge of the bag body. The hem is slitted at its rear, as at 5, 6 to form a short section 7 and a long section 8. The section 7 is disposed centrally of the rear of the mouth edge of the bag. The section 8 provides a pocket 9 for a purpose to be presently referred to.

The mouth of the body 1 is permanently maintained in open position by a one-piece, metallic frame 10 of loop-like form and which consists of an arcuate front part 11, merging into a pair of oppositely disposed, segmental end parts 12, 13 which merge into a pair of oppositely disposed, spaced rear parts 14, 15 respectively, curving forwardly from the rear ends of said end parts. The parts 11, 12, 13, 14 and 15 are positioned in the pocket 9 formed by the section 8 of the hem. The parts 14, 15 project from the ends of the section 8 of the hem. The section 7 of the hem is interposed between the inner end ends of the rear parts 14, 15.

The rear parts 14, 15 of the frame merge into a depending brace element of substantially triangular contour which inclines rearwardly from its top to its bottom. The brace element comprises a pair of oppositely disposed side members 16, 17 inclining away from each other from their upper to their lower ends. The member 16 at its upper end merges into the inner end of the rear part 14 and the member 17 at its upper end merges into the inner end of the rear part 15. The members 16, 17 merge into a forwardly curved bottom member 18 consisting of a pair of sections connected together by a sleeve 19.

The bottom member 18 is connected to the rear of the body 1 by a loop 20. A strap is employed for suspending the bag from the shoulders of a person. The strap is indicated at 21 and has one end thereof fixedly secured, as at 22 to the inner face of the rear of the body 1 at the upper portion of the latter and adjacent the slit 5. Secured to the inner face of the rear part of the body 1, at the upper portion thereof and adjacent the slit 6 is an anchoring means 23 for a buckle 24 for receiving the other end of the strap 21.

The parts 11 to 15 of the frame act to extend the mouth of the body 1 and permanently maintain it open and further to reinforce the mouth edge of the bag. The brace element acts to offset the body 1 from the body of the person carrying the bag, as well as to prevent the bag body from tipping over forwardly when filling the same, or when the bag body is filled and carried by the person, or when one is manually distributing seed from the bag. The curved bottom member 18 of the brace is designed to fit the body of the person carrying the bag so that it can be suspended and carried without any discomfiture to the person.

It is thought that the many advantages of a bag, in accordance with this invention and for the purpose referred to can be readily understood, and although the preferred embodiment of the invention is as illustrated and described, yet it is to be understood that changes in the details of construction can be had which fall within the scope of the invention as claimed.

What I claim is:

A harvester bag comprising in combination, a flexible body having an open top providing the mouth of the bag, a rearwardly projecting means secured to the outer face of the rear portion of said body and a bag mouth distending frame portion for permanently distending the mouth of the bag, said frame portion terminating in a bag offsetting member connected to said rearwardly projecting means.

In testimony whereof, I affix my signature hereto.

DANIEL E. SPEICHER.